United States Patent [19]
Palmer

[11] Patent Number: 5,837,906
[45] Date of Patent: Nov. 17, 1998

[54] APPARATUS AND METHOD FOR MEASURING THE REAL-TIME VOLUMETRIC FLOW RATE OF GRAIN IN A FIELD HARVESTER USING ACOUSTICAL TRANSDUCERS

[75] Inventor: John P. Palmer, Pomona, Calif.

[73] Assignee: Ludwig Kipp, Palm Beach, Fla.

[21] Appl. No.: 871,443

[22] Filed: Jun. 9, 1997

[51] Int. Cl.[6] ....................................... G01F 1/30
[52] U.S. Cl. ........................................ 73/861.73
[58] Field of Search ............................. 73/861.73

[56] References Cited

U.S. PATENT DOCUMENTS

| | | | |
|---|---|---|---|
| 5,257,530 | 11/1993 | Beattie et al. | 73/861.73 |
| 5,686,671 | 11/1997 | Nelson et al. | 73/861.73 |
| 5,698,794 | 12/1997 | Bussian | 73/861.73 |
| 5,736,652 | 4/1998 | Strubbe | 73/861.73 |

*Primary Examiner*—Richard Chilcot
*Assistant Examiner*—Jewel Thompson
*Attorney, Agent, or Firm*—Amster, Rothstein & Ebenstein

[57] ABSTRACT

An apparatus and method for measuring the real-time volumetric flow rate of grain in a field harvester, comprising: a transmitting acoustical transducer for transmitting acoustic signals at a selected frequency, the transmitting acoustical transducer being disposed in the harvester with respect to a flow path of an airborne stream of grain during operation of the harvester so as to transmit the acoustic signals through the airborne stream of grain, whereby the transmitted acoustic signals are attenuated or scattered when passing through the airborne stream of grain; a receiving acoustical transducer for receiving the attenuated or scattered acoustic signals after passing through the flow path of the airborne stream of grain; and a computer in communication with the transmitting acoustical transducer and the receiving acoustical transducer for measuring the real-time volumetric flow rate of the airborne stream of grain as a function of the attenuation or scattering of the transmitted acoustic signals and a flow rate calibration characteristic dependent upon the moisture content of the airborne stream of grain; in an alternative embodiment, the transmitting and receiving acoustical transducers being located on the same side relative to the airborne stream of grain, and an acoustical reflector being disposed opposite the transducers to reflect transmitted acoustical signals from the transmitting acoustical transducer back to the receiving acoustical transducer.

10 Claims, 5 Drawing Sheets

APPARATUS AND METHOD FOR MEASURING THE REAL-TIME VOLUMETRIC FLOW RATE OF GRAIN IN A FIELD HARVESTER USING ACOUSTICAL TRANSDUCERS

BACKGROUND OF THE INVENTION

The present invention relates generally to measuring the volumetric flow rate of grain in a field harvester utilizing acoustical transducers, and more particularly, a method and apparatus for measuring the real-time volumetric flow rate of grain in a field harvester by detecting and processing the attenuation of a transmitted acoustical signal through an airborne stream of grain.

It is known in the prior art to utilize different methods in systems for measuring and recording the rate of harvest of various types of grain in real-time as the grain is removed from the field. Methods for measuring either of the volumetric flow rate or the mass flow rate of the grain have been used to provide a grain flow rate signal which can be used to calculate either the total weight of the grain harvested within a given field area or the instantaneous yield of the crop at the present location of the harvester in the field. Such data enables the measurement of the effect of different soil conditions for crop growing practices with respect to crop yield. The total weight of the grain is calculated by integrating the grain mass flow rate vs. time. The instantaneous crop yield is then calculated by dividing instantaneous grain mass flow rate by the instantaneous rate at which the harvester is harvesting the field area.

U.S. Pat. No. 5,561,250 teaches a method and apparatus for measuring grain mass flow rate in harvesters utilizing an impact plate that is disposed to be impacted by grain exiting a power driven conveyor in the harvester. The impact plate is mounted on a force measuring apparatus which generates an electrical signal proportional to the grain impact force. A computer in electrical communication with the force measuring apparatus calculates the average value of grain impact force, adjusts this value to compensate for the difference between an actual measured operating speed of the conveyor and a constant reference speed, and calculates the grain mass flow rate utilizing a mass flow calibration characteristic which relates grain mass flow rate to average grain impact force. The calibration characteristic is non-linear and has different values for different grain types different grain qualities and different grain moisture contents. Electrodes are disposed on the impact plate for generating an electrical signal which is indicative of the grain moisture content, and this electrical signal is used in combination with a moisture calibration characteristic to determine grain moisture content. The traveling speed of the harvester is measured and the area rate of harvesting is calculated by multiplying the speed by a preset swath width. The instantaneous crop yield is then computed by dividing grain mass flow rate times area harvesting rate. Total weight of the grain harvested and total field harvested are calculated by integrating grain mass flow rate and area rate of harvesting, respectively. Although means may be provided by which the operator may change the calibration factor according to the grain type and the grain quality by manually entering appropriate parameters into the system, no means are provided by which the calibration factor may be adjusted automatically in response to local variations in grain quality as a field is being harvested. Consequently, data errors are likely to occur for the total amount of grain harvested, and it is not possible to automatically evaluate and map variations in the grain flow rate or in grain quality for a given field when the grain quality if a varying parameter.

U.S. Pat. No. 4,004,289 teaches an acoustic device for measuring grain flow rate utilizing acoustical sensors attached to the backside of the grain deflector that is placed in the path of the airborne grain as it is propelled through the thrasher. When grain particles and chaff strike the deflection plate, differing characteristic electronic patterns are obtained from the acoustical sensors. This technique is useful primarily for sensing when an unusual amount of grain is being lost due to discharge along with the chaff, but is not practical for measuring grain flow rates, except, perhaps at various low levels. U.S. Pat. No. 4,360,998 also teaches a device that measures grain loss with the shaft.

U.S. Pat. No. 4,765,190 discloses an apparatus in which grain that is ejected from the clean-grain elevator is caused to slide along a curved path toward the clean-grain hopper. The device measures the centrifugal force exerted by the falling grain on the curved deflector attributable to the curved flow path.

U.S. Pat. No. 5,312,299 teaches an apparatus which is similar to the device described in U.S. Pat. No. 4,004,289, but wherein the electronic patterns are processed differently. This implementation does not provide a practical means for measuring grain flow, since most of the grain does not impact the sensing deflection plate and the response of the sensors to the grain flow is expected to saturate below practical flow rates.

U.S. Pat. Nos. 5,343,761 and 5,369,603 relate to a grain flow meter manufactured by Ag Leader, which is sold as an option on John Deere combines, and to a method of calibrating the meter, respectively. This grain flow meter comprises a deflection plate that is disposed in the path of the clean-grain after chaff separation, and sensors placed on the plate to measure the impact of the grain against the plate. As the grain is dispensed by centrifugal force from the clean-grain elevator in the storage hopper of the combine, the grain is deflected by the deflection plate, causing the latter to elastically flex a few micrometers in proportion to the exerted force on the surface of the plate by the grain particles. A plurality of piezoresistive sensors are attached to the deflection plate opposite to the impact side. These sensors are connected electrically in a Wheatstone bridge configuration, and electronic processing circuitry is connected to the Wheatstone Bridge to further condition the electronic signals from the sensors and convert them to information relating to the amount of grain that is collected by the harvest combine. The use of piezoresistive sensors is a commonly used technique to measure force or pressure exerted upon a quasistatic flexor membrane or plate. The same limitations occur, due to variations in grain quality, as pertain to the '250 Patent.

The '761 and '296 Patents acknowledge that complicated mechanisms and digital algorithms are necessary in order to accurately interpret the response of the piezoresistive sensors. In the case of a grain flow meter, the response is highly non-linear and sensitive to the moisture content of the grain. This necessitates calibration requirements as described in the '603 Patent which utilize the input from a grain moisture sensor. However, a grain moisture sensor does not account for variations in grain quality resulting from local environmental factors such as fertilizer concentration, watering, or insect or other infestation.

None of the foregoing have contemplated the use of acoustical signals to measure the volumetric flow rate of grain in a field harvester in accordance where the flow rate is determined as a function of the attenuation of the acoustical signal.

SUMMARY OF THE INVENTION

In view of the above described state of the prior art, it is a primary object of the present invention to provide a method and apparatus for measuring the real-time volumetric flow rate of grain in a field harvester using acoustical transducers.

It is another object of the present invention to provide an apparatus and method for measuring the real-time volumetric flow rate of grain in a field harvester using acoustical transducers which utilizes the attenuation of a transmitted acoustical signal in an airborne stream of grain to determine the volumetric flow rate.

It is yet another object of the present invention to provide an apparatus and method for measuring the real-time volumetric flow rate of grain in a field harvester using acoustical transducers that is economical to manufacture, easy to use, and highly reliable.

It is yet another object of the present invention to provide an apparatus and method for measuring the real-time volumetric flow rate of grain in a field harvester using acoustical transducers that allows for easy certification in the field and very high measurement accuracy.

It is yet another object of the present invention to provide an apparatus for measuring the real-time volumetric flow rate of grain in a field harvester using acoustical transducers in which there is no mechanical impact between the airborne stream of grain and any components of the flow rate detection system.

It is still another object of the present invention to provide an apparatus and method for measuring the real-time volumetric flow rate of grain in a field harvester using acoustical transducers in which there is a linear relationship between the attenuation of transmitted acoustical signals and the amount of flowing grain in the acoustic path.

It is still another object of the present invention to provide an apparatus and method for measuring the real-time volumetric flow rate of grain in a field harvester using acoustic transducers in which there is a linear relationship between the scattered acoustic intensity of transmitted acoustical signals and the amount of grain flowing in the acoustical path.

It is still another object of the present invention to provide an apparatus for measuring supplementary real-time data so that the quality of grain is distinguished from the mass flow of grain and the moisture content of grain as the grain is harvested using acoustic transducers in which there is a linear relationship between the attenuated or scattered acoustic intensity of transmitted acoustical signals and the amount of grain flowing in the acoustical path.

It is still another object of the present invention to provide an apparatus and method for measuring the real-time volumetric flow rate of grain in a field harvester using acoustical transducers which can be simply retrofitted to existing in combine systems.

In accordance with the foregoing objects and additional objects that will become apparent hereinafter, the present invention provides an apparatus for measuring the real-time volumetric flow rate of grain in a field harvester, comprising: a transmitting acoustical transducer for transmitting acoustic signals at a selected frequency, the transmitting acoustical transducer being disposed with respect to a flow path of an airborne stream of grain during operation of the harvester so as to transmit the acoustic signals through the airborne stream of grain, whereby the transmitted acoustic signals are attenuated and scattered when passing through the airborne stream of grain; a receiving acoustical transducer for receiving the attenuated acoustic signals or scattered acoustical signals after passing through the flow path of the airborne stream of grain; and a computer in communication with the transmitting acoustical transducer and the receiving acoustical transducer for measuring the real-time volumetric flow rate of the airborne stream of grain as a function of the attenuation or scattering of the transmitted acoustic signals and a flow rate calibration characteristic dependent upon the moisture content of the airborne stream of grain, whereby the real-time volumetric flow rate f is determined in accordance with either the equation: $A=100*(1-e^{-f/fo})$, where A is the percent attenuation and fo is a constant dependent upon the calibration characteristic, which is dependent upon type of grain, grain moisture content, and grain quality; or the equation: $S=So*(1-e^{-f/fo})$, where So is the saturation value of scattering at high grain flow rates and fo is a constant dependent on the calibration characteristic.

The values of the parameters So and fo are dependent upon the mass density, the moisture content, and the size of the granules. In accordance with the well-known theory of acoustical scattering by particles, as described in the book Acoustics, by A. D. Pierce, published by Wiley in 1981. Since the values of the parameters depend on three variables, they cannot be determined absolutely by less than three independent measurements such as are achieved using a mass flow sensor, a moisture sensor, and a volumetric flow sensor.

In accordance with a particular embodiment of the present invention, there is provided an apparatus for measuring the real-time volumetric flow rate of grain in a field harvester, comprising: a transmitting acoustical transducer for transmitting acoustic signals at a selected frequency, the transmitting acoustical transducer being disposed in the harvester on a first side next to a flow path of an airborne stream of grain during operation of the harvester so as to transmit the acoustic signals along a path that is substantially perpendicular to the airborne stream of grain, whereby the transmitted acoustic signals are attenuated when passing through the airborne stream of grain; a receiving acoustical transducer for receiving the attenuated acoustic signals, the receiving acoustical transducer being disposed on a second side next to the flow path of the airborne stream of grain opposite to the transmitting acoustical transducer; and a computer in communication with the transmitting acoustical transducer and the receiving acoustical transducer for measuring the real-time volumetric flow rate of the airborne stream of grain as a function of the attenuation of the transmitted acoustic signals and a flow rate calibration characteristic dependent upon the moisture content of the airborne stream of grain, whereby the real-time volumetric flow rate f is determined in accordance with the equation: $A=100*(1-e^{-f/fo})$, where A is the percent attenuation and fo is a constant dependent upon the calibration characteristic.

The acoustical transmitting transducer and the acoustical receiving transducer are disposed above a clean-grain hopper for collecting the airborne stream of grain.

The apparatus further includes a moisture sensor for measuring the moisture content of the airborne stream of grain to provide the flow rate calibration characteristic The moisture sensor for measuring the moisture content of the airborne stream of grain communicates with the computer so that the computer can adjust the constant fo. The constant fo is also dependent upon installation factors and can be varied by the computer in accordance with a variety of programmed factors.

In accordance with another embodiment of the invention, there is provided an apparatus for measuring the real-time volumetric flow rate of grain in a field harvester, comprising: a transmitting acoustical transducer for transmitting acoustic signals at a selected frequency, the transmitting acoustical transducer being disposed in the harvester on a first side of a flow path of an airborne stream of grain during operation of the harvester so as to transmit the acoustic signals along a path through the airborne stream of grain, whereby the transmitted acoustic signals are attenuated when passing through the airborne stream of grain; a receiving acoustical transducer for receiving the attenuated acoustic signals, the receiving acoustical transducer being disposed on the first side of the flow path of the airborne stream of grain; an acoustically reflective surface disposed on a second side of the flow path of the airborne stream of grain for reflecting the transmitted acoustic signals back to the receiving acoustical transducer; and a computer in communication with the transmitting acoustical transducer and the receiving acoustical transducer for measuring the real-time volumetric flow rate of the airborne stream of grain as a function of the attenuation of the transmitted acoustic signals and a flow rate calibration characteristic dependent upon the moisture content of the airborne stream of grain, whereby the real-time volumetric flow rate f is determined in accordance with the equation: $A=100*(1-e^{-f/fo})$, where A is the percent attenuation and fo is a constant dependent upon the calibration characteristic.

The present invention also contemplates a method for measuring the real-time volumetric flow rate of grain in a field harvester, comprising the steps of:

transmitting acoustic signals at a selected frequency from a transmitting acoustical transducer being disposed with respect to a flow path of an airborne stream of grain during operation of the harvester through the airborne stream of grain, whereby the transmitted acoustic signals are attenuated when passing through the airborne stream of grain;

receiving the attenuated acoustic signals with a receiving acoustical transducer after passing through the flow path of the airborne stream of grain; and measuring the real-time volumetric flow rate of the airborne stream of grain as a function of the attenuation of the transmitted acoustic signals and a flow rate calibration characteristic dependent upon the moisture content of the airborne stream of grain, whereby the real-time volumetric flow rate f is determined in accordance with the equation: $A=100*(1-e^{-f/fo})$, where A is the percent attenuation and fo is a constant dependent upon the calibration characteristic, with digital circuitry in communication with the transmitting acoustical transducer and the receiving acoustical transducer.

In another embodiment, the present invention provides a method for measuring the real-time volumetric flow rate of grain in a field harvester, comprising the steps of:

transmitting acoustic signals at a selected frequency from a transmitting acoustical transducer being disposed on a first side of a flow path of an airborne stream of grain during operation of the harvester through the airborne stream of grain, whereby the transmitted acoustic signals are attenuated when passing through the airborne stream of grain;

reflecting the transmitted acoustic signals with an acoustically reflective surface disposed on a second side of the flow path of the airborne stream of grain;

receiving the attenuated acoustic signals with a receiving acoustical transducer being disposed on the first side of the flow path of the airborne stream of grain; and measuring the real-time volumetric flow rate of the airborne stream of grain as a function of the attenuation of the transmitted acoustic signals and a flow rate calibration characteristic dependent upon the moisture content of the airborne stream of grain, whereby the real-time volumetric flow rate f is determined in accordance with the equation: $A=100*(1-e^{-f/fo})$, where A is the percent attenuation and fo is a constant dependent upon the calibration characteristic, with digital circuitry in communication with the transmitting acoustical transducer and the receiving acoustical transducer.

The transmitting acoustical transducer generates acoustical signals of a desired frequency. A digital processor provides a coded signal to a modulator which receives a signal from an oscillator and modulates the signal and communicates with the transmitting acoustical transducer. The receiving acoustical transducer picks up the attenuated acoustic signal, and the transduced signal is provided to an amplifier, the gain of which is controlled by the digital processor. The amplified received signal is digitally converted by an A/D converter and communicated to the digital processor, which adjusts the gain of the amplifier to a level at which digital code signals transduced by the receiving acoustical transducer can be accurately and reliably decoded. The gain level of the amplifier at such condition is utilized to determine the level of attenuation in the acoustic signal transmitted through the airborne stream of grain by the transmitting acoustical transducer.

An operator interface is provided to enable the harvester operator to set values for the calibration constant fo, such as those appropriate for the particular harvester, and to set values for operating variables, including grain moisture and the like. The moisture content may be measured or estimated by the harvest operator, or by measuring the capacitance between two electrodes mounted on a plate in the region of the airborne stream of grain to develop a moisture calibration characteristic in accordance with known techniques. The operator interface communicates with a central processing unit for the combine, and includes a suitable display and input/output control circuitry as is well known in the art.

In accordance with another embodiment of the invention, there is provided method for measuring the real-time volumetric flow rate of grain in a field harvester, comprising the steps of:

transmitting acoustical signals at a selected frequency from a transmitting acoustical transducer being disposed in the harvester on the first side of a flow path of an airborne stream of grain during operation of the harvester so as to transmit the acoustic signals along a path through the airborne stream of grain, whereby the transmitted acoustic signals are scattered when passing through the airborne stream of grain;

receiving the scattered acoustic signals with a receiving acoustical transducer being disposed on a second side of the flow path of the airborne stream of grain, the location of which is such that the acoustical signal received by the receiving acoustical transducer is maximized in response to the scattered acoustic signals;

measuring the real-time volumetric flow rate of the airborne stream of grain as a function of the scattering of the acoustic signals and a flow rate calibration characteristic dependent upon the size and density of the granules of the airborne stream of grain, whereby the real-time volumetric flow rate f is determined in accordance with the equation: $S=So*(1-e^{-f/fo})$, where S is the received scattered signal intensity, So is the saturation value of scattering at high grain flow rates, and fo is a constant dependent on the calibration characteristic.

In another embodiment of the present invention, there is provided an apparatus for automatic real-time adjustment of the calibration of the mass flow sensor that currently is used in some harvesters, thereby taking into account the changing quality of grain as the field is harvested, comprising: a transmitting acoustical transducer for transmitting acoustic signals at a selected frequency, and a receiving acoustical transducer for receiving acoustic signals that are attenuated or scattered by the airborne grain flow, which communicate with the on-board computer of the grain harvester, as previously described for the other embodiments.

The many advantages of the present invention will best be understood in accordance with the detailed description below with particular reference to the accompanying drawings.

DETAILED DESCRIPTION OF THE PREFERRED EMBODIMENT

Figure 1:
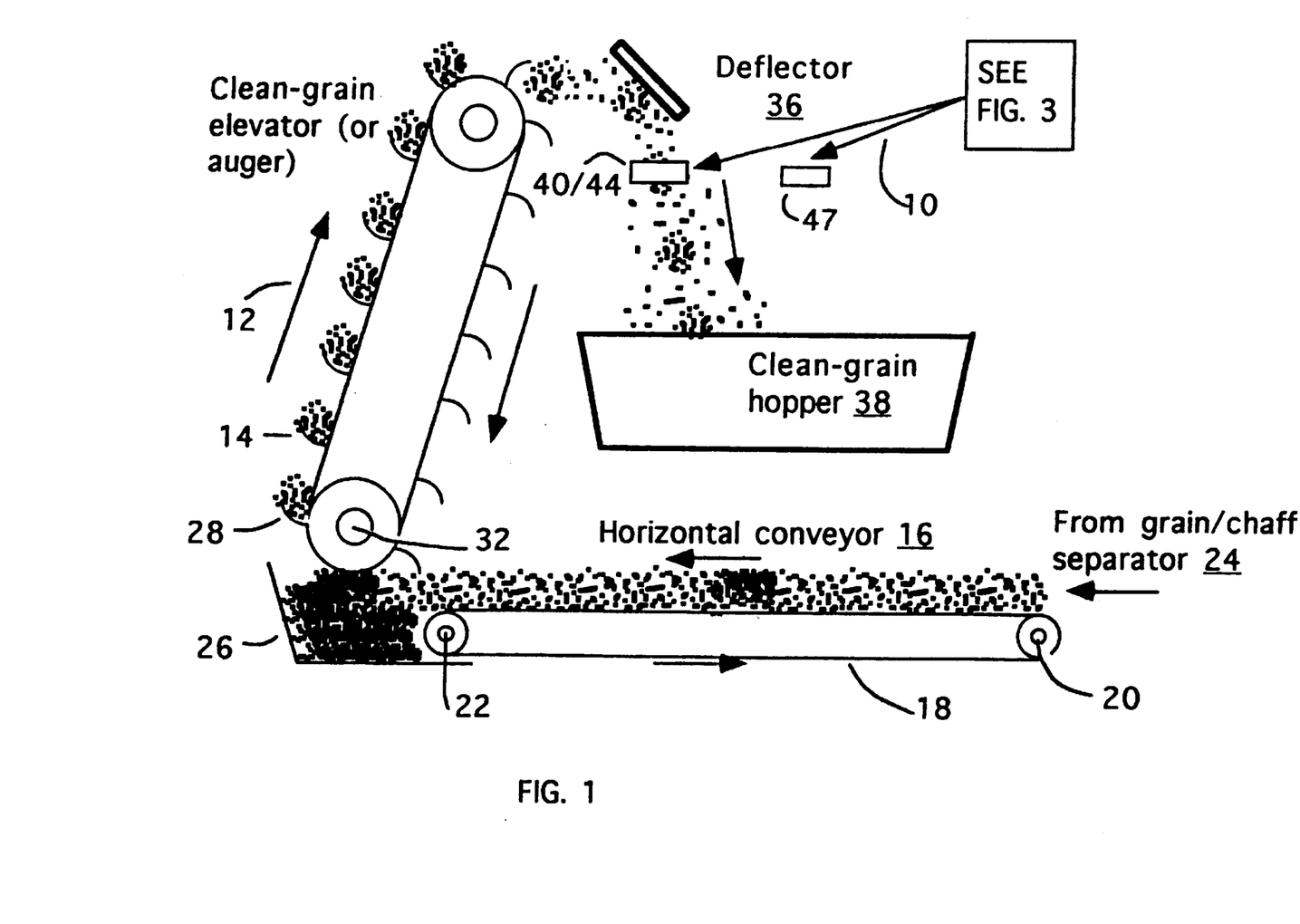
FIG. 1 is a side view schematic of a harvester and flow rate measurement apparatus in accordance with the present invention.

Referring now to the several views of the drawing there is shown an apparatus generally designated by the reference numerical 10 for measuring the real-time volumetric flow rate of grain in a field harvester 12. Referring to FIG. 1, the field harvester 12 generally comprises a clean-grain elevator assembly 14 and a horizontal conveyer 16. The horizontal conveyer 16 includes an endless belt 18 which is rotatably driven about pulleys 20 and 22. Endless belt 18 receives clean-grain from a grain/chaff separator 24 (not shown) and transports it to a collection pan 26. The accumulated grain is then transported up the clean-grain elevator 14. The clean-grain elevator 14 comprises a plurality of paddles 28 which are attached to a chain or endless belt 30 which is rotatably driven about pulleys 32 and 34. A volumetric quantity of grain is continually discharged from the elevator paddles 28 against a deflector 36, and thereby caused to fall downwardly as an airborne stream of grain into a clean-grain hopper 38. The airborne stream of grain follows a flow path in a generally vertical direction in a conventional manner. In lieu of the depicted clean-grain elevator, certain harvesters 12 contain an auger mechanism which provides the same function to elevate the grain and deposit the same against the deflector 36 and into clean-grain hopper 38 as described above. The general principle of operation is the same.

Figure 2A:
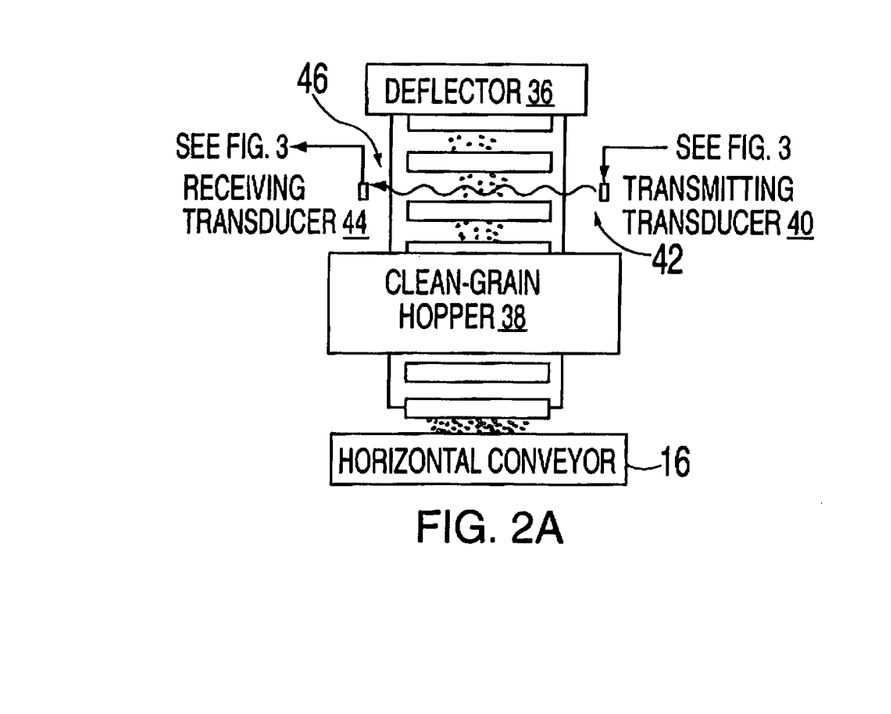
FIG. 2A is a front view schematic of the apparatus depicted in FIG. 1.
Figure 4:
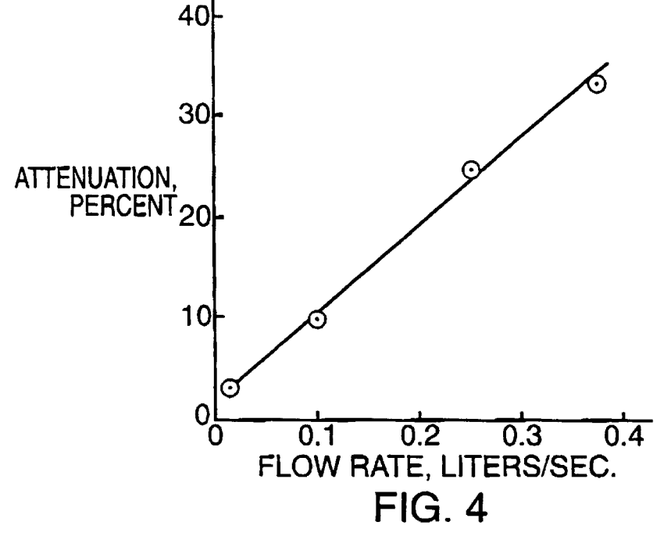
FIG. 4 is a graph depicting volumetric flow rate vs. attenuation in a sample application.
Figures 5, 6, 7:
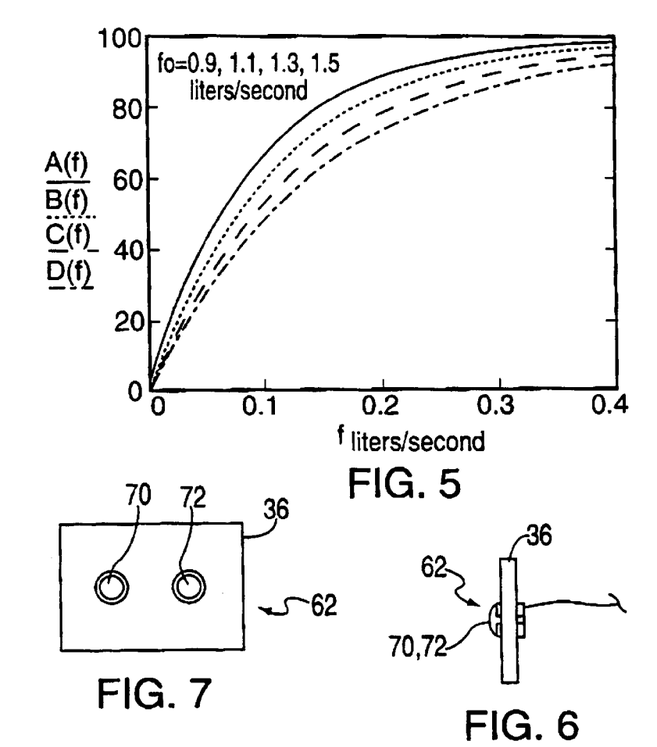
FIG. 5 is a graph depicting the relationship between volumetric flow rate and attenuation for different calibration constants in a sample application.
FIG. 6 is an enlarged view of a deflector plate containing a grain moisture sensor.
FIG. 7 is a plan view of the deflector plate shown in FIG. 6.

The flow rate apparatus 10 is adapted for determining the volumetric flow rate of the airborne stream of grain as it follows a flow path from the deflector 36 to the clean-grain hopper 38 as a function of the attenuation of an acoustical signal transmitted through the airborne stream of grain. In this connection, a transmitting acoustical transducer 40 is disposed in the harvester 12 on a first side 42 next to the flow path of the airborne stream of grain as shown in FIG. 2A. The transmitting acoustical transducer 40 is adapted to transmit acoustic signals along a path that is substantially perpendicular to the airborne stream of grain. A receiving acoustical transducer 44 is disposed on a second side 46 next to the flow path of the airborne stream of grain opposite to the transmitting acoustical transducer 40. The transmitting acoustical transducer 40 generates acoustical signals of a desired frequency in accordance with the description below. An ultrasonic frequency on the order of 40 kHz has been demonstrated to provide favorable results with a linear relationship between acoustic attenuation and volumetric flow rate, although other, preferably lower frequencies can be used well. A graphical depiction of the volumetric flow rate versus acoustical attenuation with respect to an airborne stream of rice in testing is shown in FIG. 4. The data is linear over the flow rate tested and is represented by the phenomenological equation: $A=100*(1-e^{-f/fo})$, where A is the percent attenuation, e is the basis number for natural logarithms, f is the flow rate (liters/second), fo is the value of f for which A is within a factor of $1/e*100$ (its asymptotic value). The variable fo is a flow rate calibration characteristic which is dependent upon the moisture content of the airborne stream of grain as well as other operating variables, including the particular harvester in use. A sample of curves representing volumetric flow rate as a function of attenuation for various values of fo is shown in FIG. 5. The determination of the calibration characteristic is implemented in accordance with principles known in the art and will be described in more detail below.

Figure 2B:
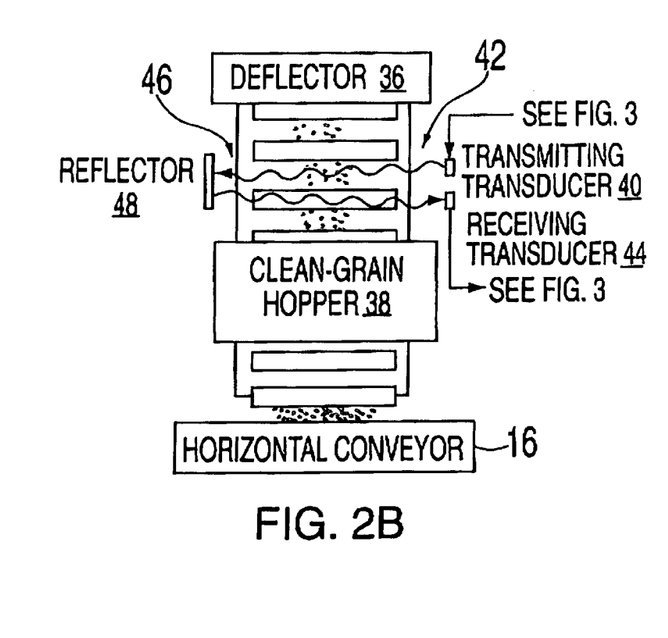
FIG. 2B is a front view schematic of an alternative embodiment of the apparatus shown in FIG. 2A.

Referring now to FIG. 2B, there is shown another embodiment of the invention in which the transmitted acoustical transducer 40 and receiving acoustical transducer 44 are both disposed in the harvester 12 on the first side 42 next to the airborne stream of grain as shown. In this connection, an acoustical reflector 48 is mounted opposite the transmitting acoustical transducer 40 and receiving acoustical transducer 44 on the second side 46 of the airborne stream of grain. Accordingly, transmitted acoustical signals pass through the airborne stream of grain, reflect back off the acoustical reflector 48, travel through the airborne stream of grain again and are picked up by the receiving acoustical transducer 44. As with the first embodiment shown in FIG. 2A, the attenuation attributable to the acoustical signals passing through the airborne stream of grain is measured and the volumetric flow rate then calculated. However, in the case of the reflected acoustical signal embodiment, the level of attenuation is greater due to the transmitted acoustical signal traveling through the flow path of the grain twice before being received by the receiving acoustical transducer 44. This is taken into account when calculating the volumetric flow rate.

Figure 2C:
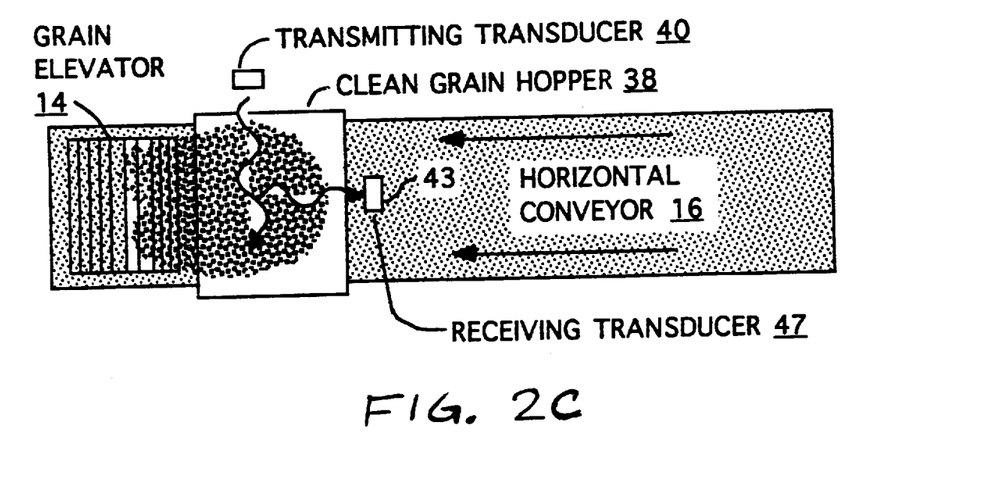
FIG. 2C is a top view schematic of another alternative embodiment of the apparatus shown in FIG. 2A.

Referring now to FIG. 2C, there is shown another embodiment of the invention in which the transmitting acoustical transducer 40 is disposed in the harvester 12 on a first side 42 and the receiving acoustical transducer 47 is disposed at a location that is not directly in the path of the acoustical beam that is transmitted by acoustical transducer 40, for example toward the front of the harvester. In this connection, the acoustic signals received by the receiving acoustical transmitter 47 are predominately acoustic signals that have been scattered by the flowing particles of grain.

The scattering attributable to the acoustic signals passing from the transmitting acoustical transducer 40 to the receiving acoustical transmitter 47 is measured, and the volumetric flow rate is then calculated. However, in the case of the reception of the scattered acoustical signal, the sensitivity to changes in the flow rate of the received signal is much greater than it is for the embodiments depicted in FIGS. 2A and 2B because the background signal corresponding to zero grain flow is much less for the embodiment depicted in FIG. 2C.

Figure 3:
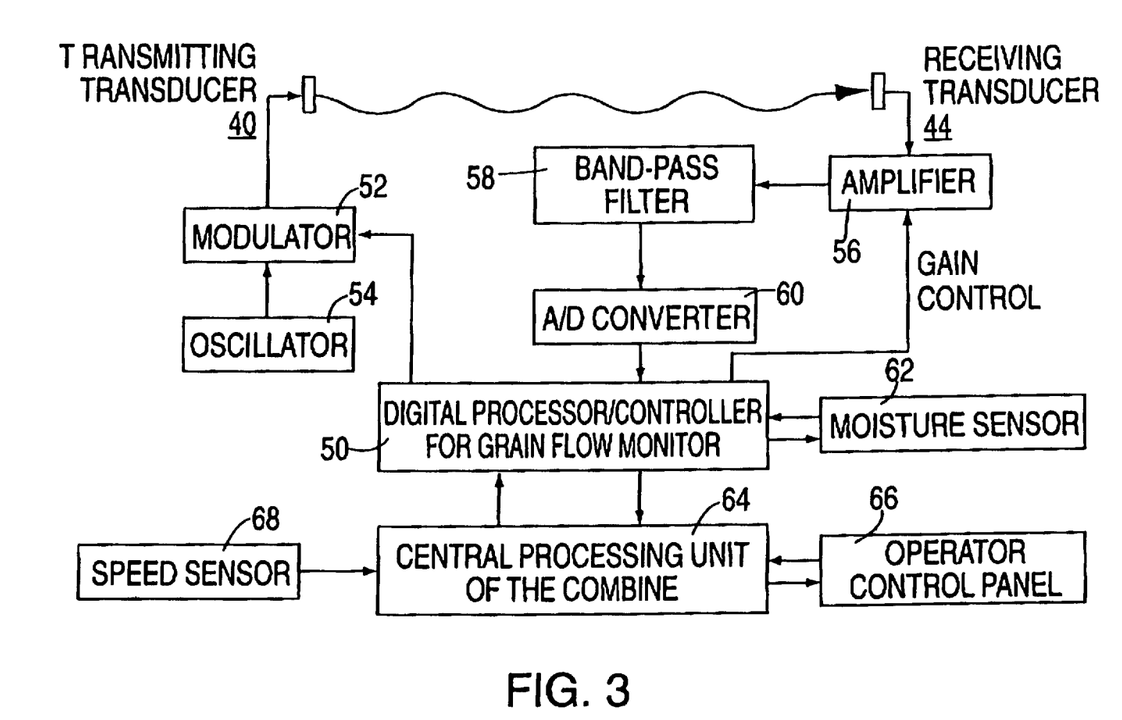
FIG. 3 is a block diagram of the flow rate measurement apparatus.

Referring now to FIG. 3, there is shown a block diagram of the grain flow sensor 10. The transmitting acoustical transducer 40 generates acoustical signals at a selected frequency. A digital processor 50 provides a coded signal through a modulator 52 which receives a signal from an oscillator and modulates the signal and communicates with the transmitting acoustical transducer 40. The acoustical transmitter transmits either amplitude or frequency modulated signals using a specified digital code pattern, e.g., 0011001, which is continually repeated. The receiving acoustical transducer 44 (or transducer 47) picks up the attenuated (or scattered) acoustic signal and the transduced signal is provided to an amplifier 56, the gain of which is controlled by digital processor 50. The amplified received signal is applied to a band-pass filter 58, digitally converted by an A/D converter 60 and communicated to the digital processor 50, which adjusts the gain of the amplifier 56 to a level at which the digital code signals transduced by the receiving acoustical transducer 44 (or 47) can be accurately and reliably decoded. The gain level of the amplifier 56 at such condition is utilized to determine the level of attenuation or scattering in the acoustic signal transmitted through the airborne stream of grain by the transmitting acoustical transducer 40. The digital processor 15 is programmed to calculate the volumetric flow rate in accordance with the above-identified relationship between attenuation and flow rate, taking into account the flow rate calibration characteristic fo in accordance with the moisture content of the grain and other calibration variables depending upon the harvester set up. A moisture sensor 62 communicates with digital processor 50 in this regard. The digital processor 50 also communicates with a central processing unit 64, which manages operation of the harvester 12 and enabling input from an operator control panel 66 and harvester speed sensor 68.

As discussed above, the attenuation of the transmitted acoustical signal is dependent upon the moisture content of the grain. Accordingly, the moisture sensor 62 enables a measurement to be made of the grain moisture content to determine the necessary calibration characteristic represented by fo. One way of implementing such measurement is by utilizing a capacitive type grain moisture tester. In this connection, a pair of electrodes 70, 72 are mounted on the deflector 36 and are electrically isolated from the deflector 36 by non-conductive washers (not shown). The electrodes 70, 72 are each connected through individual lead wires to remote signal conditioning circuitry and to the digital processor 50. The electrodes 70, 72 act as the plates of the capacitor, while the free space in front of the electrodes and the grain which strikes the deflector 36 acts as the dielectric material of the capacitor. The capacitance value of the capacitor formed by the electrodes 70, 72 and the associated dielectric material is proportional to the amount and moisture content of the grain as is known in the art. The remote signal conditioning circuitry excites the electrodes 70, 72 with high frequency voltage signals so that a measuring circuit can determine the capacitance existing between the electrodes 70, 72. The value of the measured capacitance can then be utilized to calculate the grain moisture content based upon a predetermined moisture calibration characteristic. When there is no grain striking the deflector 36, the capacitance between the electrodes 70, 72 is a small value attributable to the finite dielectric value of the free space around the electrodes 70, 72. Accordingly, this provides a small baseline capacitance which is subsequently subtracted from the measured capacitance to produce a net capacitance with is used to calculate the grain moisture content. The digital processor 50 stores the baseline capacitance value so that it can be subsequently subtracted from the capacitance value measured when the grain is flowing.

The capacitance measured between electrodes 70, 72 is dependent upon the amount of grain as well as the moisture content of the grain. Accordingly, the amount of grain is divided out from the net increase in capacitance measured by the electrodes 70, 72 to provide a value indicative of the grain moisture content.

In lieu of capacitive methods, it is also possible to measure grain moisture content by utilizing the resistive characteristics of the grain by measuring the current flow between the electrodes 70, 72 with a constant voltage potential applied to them. The measurement of grain moisture content is generally known in the art and it is anticipated that many different types of methods can be utilized, with the above being merely exemplary.

In accordance with the foregoing, there is provided a method for measuring the real-time volumetric flow rate of grain in a field harvester 12 comprising the steps of:

transmitting acoustic signals at a select frequency from a transmitting acoustical transducer 40 being disposed in the harvester 12 on a first side 42 of a flow path of an airborne stream of grain during operation of the harvester 12 through the airborne stream of grain, whereby the transmitted acoustic signals are attenuated when passing through the airborne stream of grain;

receiving the attenuated acoustic signals with a receiving acoustical transducer 44 being disposed on a second side 46 of the flow path of the airborne stream of grain opposite to the transmitting acoustical transducer 40; and measuring the real-time volumetric flow rate of the airborne stream of grain as a function of the attenuation of the transmitted acoustic signals and the flow rate calibration characteristic dependent upon the moisture content of the airborne stream of grain, whereby the real-time volumetric flow rate f is determined in accordance with the equation $A=100*(1-e^{-f/fo})$, where A is the percent attenuation and fo is a constant dependent upon the calibration characteristic, with a digital processor in communication with the transmitting acoustical transducer 40 and the receiving acoustical transducer 44.

In another embodiment, the present invention provides a method for measuring the real-time volumetric flow rate of grain a field harvester 12, comprising the steps of:

transmitting acoustic signals at a selected frequency from a transmitting acoustical transducer 40 being disposed in the harvester 12 on a first side 42 of a flow path of an airborne stream of grain during operation of the harvester 12 through the airborne stream of grain, whereby the transmitted acoustic signals are attenuated when passing through the airborne stream of grain;

reflecting the transmitted acoustic signals with an acoustically reflective surface 48 disposed on a second side 46 of the flow path of the airborne stream of grain;

receiving the attenuated acoustic signals with a receiving acoustical transducer being disposed on the first side 42 of the flow path of the airborne stream of grain; and 
measuring the real-time volumetric flow rate of an airborne field of grain as a function of the attenuation of the transmitted acoustic signals and a flow rate calibration characteristic dependent upon the moisture content of the airborne stream of grain, whereby the real-time volumetric flow rate f is determined in accordance with the equation: $A=100*(1-e^{-f/fo})$.

The present invention has been shown and described in what are considered to be the most practical and preferred embodiments. It is anticipated, however, that the departures may be made therefrom and that obvious modification may be implemented by persons skilled in the art.

I claim:

1. An apparatus for measuring the real-time volumetric flow rate of grain in a field harvester, comprising:

a transmitting acoustical transducer for transmitting acoustic signals at a selected frequency, said transmitting acoustical transducer being disposed with respect to a flow path of an airborne stream of grain during operation of said harvester so as to transmit said acoustic signals through said airborne stream of grain, whereby said transmitted acoustic signals are attenuated when passing through said airborne stream of grain;

a receiving acoustical transducer for receiving said attenuated acoustic signals after passing through said flow path of said airborne stream of grain; and computing means in communication with said transmitting acoustical transducer and said receiving acoustical transducer for measuring the real-time volumetric flow rate of said airborne stream of grain as a function of said attenuation of said transmitted acoustic signals and a flow rate calibration characteristic dependent upon the moisture content of said airborne stream of grain, whereby the real-time volumetric flow rate f is determined in accordance with the equation: $A=100*(1-e^{-f/fo})$, where A is the percent attenuation and fo is a constant dependent upon said calibration characteristic.

2. The apparatus for measuring the real-time volumetric flow rate of grain as recited in claim 1, wherein said transmitting acoustical transducer is disposed on a first side of said airborne stream of grain and said receiving acoustical transducer is disposed on a second side of said airborne stream of grain opposite to said transmitting acoustical transducer.

3. The apparatus for measuring the real-time volumetric flow rate of grain as recited in claim 1, further comprising means for measuring said moisture content of said airborne stream of grain to provide said flow rate calibration characteristic, said means for measuring said moisture content of said airborne stream of grain communicating with said computing means.

4. The apparatus for measuring the real-time volumetric flow rate of grain recited in claim 1, wherein said acoustical transmitting transducer and said acoustical receiving transducer are disposed above a clean-grain hopper for collecting said airborne stream of grain.

5. An apparatus for measuring the real-time volumetric flow rate of grain in a field harvester, comprising:

a transmitting acoustical transducer for transmitting acoustic signals at a selected frequency, said transmitting acoustical transducer being disposed on a first side of a flow path of an airborne stream of grain during operation of said harvester so as to transmit said acoustic signals along a path through said airborne stream of grain, whereby said transmitted acoustic signals are attenuated when passing through said airborne stream of grain;

a receiving acoustical transducer for receiving said attenuated acoustic signals, said receiving acoustical transducer being disposed on said first side of said flow path of said airborne stream of grain;

an acoustically reflective surface disposed on a second side of said flow path of said airborne stream of grain for reflecting said transmitted acoustic signals back to said receiving acoustical transducer; and computing means in communication with said transmitting acoustical transducer and said receiving acoustical transducer for measuring the real-time volumetric flow rate of said airborne stream of grain as a function of said attenuation of said transmitted acoustic signals and a flow rate calibration characteristic dependent upon the moisture content of said airborne stream of grain, whereby the real-time volumetric flow rate f is determined in accordance with the equation: $A=100*(1-e^{-f/fo})$, where A is the percent attenuation and fo is a constant dependent upon said calibration characteristic.

6. The apparatus for measuring the real-time volumetric flow rate of grain as recited in claim 5, further comprising means for measuring said moisture content of said airborne stream of grain to provide said flow rate calibration characteristic, said means for measuring said moisture content of said airborne stream of grain communicating with said computing means.

7. A method for measuring the real-time volumetric flow rate of grain in a field harvester, comprising the steps of:

transmitting acoustic signals at a selected frequency from a transmitting acoustical transducer being disposed with respect to a flow path of an airborne stream of grain during operation of said harvester through said airborne stream of grain, whereby said transmitted acoustic signals are attenuated when passing through said airborne stream of grain;

receiving said attenuated acoustic signals with a receiving acoustical transducer after passing through said flow path of said airborne stream of grain; and measuring the real-time volumetric flow rate of said airborne stream of grain as a function of said attenuation of said transmitted acoustic signals and a flow rate calibration characteristic dependent upon the moisture content of said airborne stream of grain, whereby the real-time volumetric flow rate f is determined in accordance with the equation: $A=100*(1-e^{-f/fo})$, where A is the percent attenuation and fo is a constant dependent upon said calibration characteristic, with computing means in communication with said transmitting acoustical transducer and said receiving acoustical transducer.

8. A method for measuring the real-time volumetric flow rate of grain in a field harvester, comprising the steps of:

transmitting acoustic signals at a selected frequency from a transmitting acoustical transducer being disposed on a first side of a flow path of an airborne stream of grain during operation of said harvester through said airborne stream of grain, whereby said transmitted acoustic signals are attenuated when passing through said airborne stream of grain;

reflecting said transmitted acoustic signals with an acoustically reflective surface disposed on a second side of said flow path of said airborne stream of grain;

receiving said attenuated acoustic signals with a receiving acoustical transducer being disposed on said first side of said flow path of said airborne stream of grain; and measuring the real-time volumetric flow rate of said airborne stream of grain as a function of said attenuation of said transmitted acoustic signals and a flow rate calibration characteristic dependent upon the moisture content of said airborne stream of grain, whereby the real-time volumetric flow rate f is determined in accordance with the equation: $A=100*(1-e^{-f/fo})$, where A is the percent attenuation and fo is a constant dependent upon said calibration characteristic, with computing means in communication with said transmitting acoustical transducer and said receiving acoustical transducer.

9. An apparatus for measuring the real-time volumetric flow rate of grain in a field harvester, comprising:

a transmitting acoustical transducer for transmitting acoustic signals at a selected frequency, said transmitting acoustical transducer being disposed with respect to a flow path of an airborne stream of grain during operation of said harvester so as to transmit said acoustic signals through said airborne stream of grain, whereby said transmitted acoustic signals are scattered when passing through said airborne stream of grain;

a receiving acoustical transducer for receiving said scattered acoustic signals after passing through said flow path of said airborne stream of grain; and computing means in communication with said transmitting acoustical transducer and said receiving acoustical transducer for measuring the real-time volumetric flow rate of said airborne stream of grain as a function of said scattering of said transmitted acoustic signals and a flow rate calibration characteristic dependent upon the size and density6 of the granules of said airborne stream of grain, whereby the real-time volumetric flow rate f is determined in accordance with the equation: $S=So*(1-e^{-f/fo})$, where S is the received scattered signal density, So is the saturation value of scattering at high grain flow rates and fo is a constant dependent upon said calibration characteristic.

10. A method for measuring the real-time volumetric flow rate of grain in a field harvester, comprising the steps of:

transmitting acoustical signals at a selected frequency from a transmitting acoustical transducer being disposed in said harvester on the first side of a flow path of an airborne stream of grain during operation of said harvester so as to transmit the acoustic signals along a path through the airborne stream of grain, whereby said transmitted acoustic signals are scattered when passing through said airborne stream of grain;

receiving said scattered acoustic signals with a receiving acoustical transducer being disposed on a second side of the flow path of said airborne stream of grain, the location of which is such that said acoustical signal received by said receiving acoustical transducer is maximized in response to said scattered acoustic signals;

measuring the real-time volumetric flow rate of said airborne stream of grain as a function of the scattering of said acoustic signals and a flow rate calibration characteristic dependent upon the size and density of the granules of the airborne stream of grain, whereby the real-time volumetric flow rate f is determined in accordance with the equation: $S=So*(1-e^{-f/fo})$, where S is the received scattered signal intensity, So is the saturation value of scattering at high grain flow rates, and fo is a constant dependent on the calibration characteristic.

* * * * *